United States Patent
Soderstrom

(10) Patent No.: US 11,334,927 B2
(45) Date of Patent: May 17, 2022

(54) CONSUMER CONTROLLED PORTFOLIO CHARITABLE GIVING SYSTEM AND METHOD

(71) Applicant: Change Up Inc., Wilmington, DE (US)

(72) Inventor: Robert W. Soderstrom, Los Angeles, CA (US)

(73) Assignee: Change Up Inc., Los Angeles, CA (US)

(*) Notice: Subject to any disclaimer, the term of this patent is extended or adjusted under 35 U.S.C. 154(b) by 0 days.

(21) Appl. No.: 17/153,313

(22) Filed: Jan. 20, 2021

(65) Prior Publication Data
US 2021/0390591 A1 Dec. 16, 2021

Related U.S. Application Data

(63) Continuation-in-part of application No. 16/533,445, filed on Aug. 6, 2019, now Pat. No. 10,991,015, which is a continuation-in-part of application No. 16/532,874, filed on Aug. 6, 2019, and a continuation-in-part of application No. 15/181,781, filed on Jun. 14, 2016, which is a continuation-in-part of application No. 14/625,612, filed on Feb. 18, 2015, now abandoned, which is a continuation-in-part of application No. 13/738,949, filed on Jan. 10, 2013, now abandoned.

(60) Provisional application No. 62/851,452, filed on May 22, 2019, provisional application No. 61/610,912, filed on Mar. 14, 2012, provisional application No. 61/585,075, filed on Jan. 10, 2012.

(51) Int. Cl.
G06Q 30/02 (2012.01)
G06Q 20/34 (2012.01)

(52) U.S. Cl.
CPC ..... *G06Q 30/0279* (2013.01); *G06Q 20/3552* (2013.01); *G06Q 30/0283* (2013.01)

(58) Field of Classification Search
CPC .......... G06Q 20/0279; G06Q 20/3552; G06Q 30/0283
USPC ...................................................... 705/3–44
See application file for complete search history.

(56) References Cited

U.S. PATENT DOCUMENTS

| | | |
|---|---|---|
| 5,546,303 A | 8/1996 | Helbling |
| 6,112,191 A | 8/2000 | Burke |
| 6,876,971 B1 | 4/2005 | Burke |

(Continued)

OTHER PUBLICATIONS

Gervini, Creating charitable contribution policies, Bank Marketing 31.9: 11-12., American Bankers Association, (Year: Sep. 1999).*

(Continued)

*Primary Examiner* — Frantzy Poinvil
(74) *Attorney, Agent, or Firm* — Grumbles Law PLLC

(57) ABSTRACT

A donation facilitation system that can allow a donor, such as a customer, to challenge another entity, such as a provider, to make a provider contribution to a portfolio of charities set up by the donor upon, for example, the purchase of a good or service from the provider. The provided portfolio donation facilitation system can allow the other entity such as a provider to create its own provider portfolio of charities and make a provider contribution to a customer's portfolio of charities when at least one component of the provider's portfolio of charities matches at least one component of the customer's portfolio of charities.

23 Claims, 9 Drawing Sheets

(56) References Cited

U.S. PATENT DOCUMENTS

| | | | |
|---|---|---|---|
| 7,571,849 B2 | 8/2009 | Burke | |
| 8,010,450 B2 | 8/2011 | Palmer | |
| 8,025,217 B2 | 9/2011 | Burke | |
| 8,041,606 B2 * | 10/2011 | Mascavage, III | G06Q 20/10 705/37 |
| 8,160,922 B2 | 4/2012 | Postrel | |
| 8,214,238 B1 * | 7/2012 | Fairfield | G06Q 30/0203 705/7.29 |
| 8,214,287 B1 | 7/2012 | Garfield | |
| 8,478,661 B1 | 7/2013 | Kressler | |
| 8,484,142 B2 | 7/2013 | Pinckney | |
| 8,583,549 B1 * | 11/2013 | Mohsenzadeh | G06Q 30/02 705/38 |
| 8,615,445 B2 | 12/2013 | Dorsey | |
| 8,635,137 B2 | 1/2014 | Carretta et al. | |
| 8,639,619 B1 | 1/2014 | Priebatsch | |
| 8,712,877 B2 | 4/2014 | Stremler et al. | |
| 8,725,597 B2 | 5/2014 | Mauseth | |
| 8,763,896 B2 | 7/2014 | Kushevsky | |
| 9,245,231 B2 | 1/2016 | Pinckney | |
| 9,754,294 B2 | 9/2017 | Hosny | |
| 10,755,281 B1 * | 8/2020 | Yip | G06Q 20/4016 |
| 10,878,424 B2 | 12/2020 | Tetali et al. | |
| 11,093,972 B1 * | 8/2021 | Tietzen | H04N 21/41407 |
| 2002/0032609 A1 | 3/2002 | Wilkman | |
| 2003/0177084 A1 | 9/2003 | Cassani et al. | |
| 2003/0208432 A1 | 11/2003 | Wallman | |
| 2004/0249735 A1 | 12/2004 | Cassani | |
| 2005/0021363 A1 | 1/2005 | Stimson et al. | |
| 2005/0051617 A1 | 3/2005 | Gorelick | |
| 2005/0167483 A1 | 8/2005 | Burke | |
| 2005/0171849 A1 | 8/2005 | Brissette | |
| 2006/0212390 A1 | 9/2006 | Gruber | |
| 2006/0231608 A1 | 10/2006 | Gorelick | |
| 2006/0235713 A1 | 10/2006 | Tobler et al. | |
| 2006/0259424 A1 | 11/2006 | Turcotte et al. | |
| 2007/0061252 A1 | 3/2007 | Burke | |
| 2008/0222029 A1 | 9/2008 | Poster | |
| 2008/0319896 A1 | 12/2008 | Carlson et al. | |
| 2009/0192873 A1 | 7/2009 | Marble | |
| 2010/0010886 A1 | 1/2010 | Flynn, Jr. | |
| 2010/0312650 A1 | 12/2010 | Pinckney | |
| 2011/0047035 A1 | 2/2011 | Gidwani | |
| 2011/0078050 A1 | 3/2011 | Schwartz | |
| 2012/0047009 A1 * | 2/2012 | Turner | G06Q 30/0238 705/14.38 |
| 2012/0185314 A1 | 7/2012 | Postrel | |
| 2012/0317044 A1 | 12/2012 | Massarik | |
| 2013/0151432 A1 * | 6/2013 | Kashner | G06Q 40/02 705/329 |
| 2013/0151433 A1 | 6/2013 | Hicks et al. | |
| 2013/0179347 A1 | 7/2013 | Soderstrom | |
| 2013/0204801 A1 * | 8/2013 | Downs | G06Q 30/0279 705/329 |
| 2013/0246145 A1 | 9/2013 | Ringewald | |
| 2013/0268432 A1 | 10/2013 | Kressler | |
| 2014/0129435 A1 | 5/2014 | Pardo | |
| 2014/0156442 A1 | 6/2014 | Cushing | |
| 2014/0365285 A1 | 12/2014 | Bahna et al. | |
| 2014/0372319 A1 | 12/2014 | Wolovitz | |
| 2015/0006426 A1 | 1/2015 | Sobhani et al. | |
| 2015/0066742 A1 | 3/2015 | Chatterton et al. | |
| 2015/0127530 A1 | 5/2015 | Wick | |
| 2015/0161685 A1 | 6/2015 | Soderstrom | |
| 2015/0332314 A1 | 11/2015 | Chakraborty | |
| 2015/0348014 A1 | 12/2015 | Van Os | |
| 2015/0348018 A1 | 12/2015 | Campos | |
| 2015/0379591 A1 | 12/2015 | Massarik | |
| 2016/0300283 A1 | 10/2016 | Soderstrom | |
| 2017/0278125 A1 | 9/2017 | Tietzen et al. | |
| 2018/0096325 A1 * | 4/2018 | Panzo | G06Q 20/3278 |
| 2018/0330409 A1 * | 11/2018 | Majzner | G06Q 30/08 |
| 2019/0362416 A1 * | 11/2019 | Pesch | G06Q 30/08 |
| 2019/0392489 A1 * | 12/2019 | Tietzen | H04L 9/0637 |
| 2020/0043062 A1 | 2/2020 | Soderstrom | |
| 2020/0265482 A1 | 8/2020 | Mackoul et al. | |
| 2020/0372552 A1 | 11/2020 | Soderstrom | |
| 2021/0082005 A1 | 3/2021 | David et al. | |

OTHER PUBLICATIONS

Go Daddy Operating Company, LLC; Round Up for Charity; Jul. 6, 2011; http://www.godaddy.com/charity/roundupforcharity.aspx?ci=46641.

Elliot Silver; Go Daddy Checkout Option: "Round Up and Give to Hope for Haiti"; Apr. 15, 2011; http://www.elliotsblog.com/go-daddy-round-up-and-give-to-hope-for-haiti-1990.

Bank of America Corporation; The Keep the Change program makes savings automatic; 2013; http://www.bankofamerica.com/promos/jump/ktc_coinjar/index.cfm?&statecheck=MN.

Yelp; Tokens at Whole Foods? San Francisco, Yelp Local Questions & Answers; Jan. 20, 2007; www.yelp.com/topic/san-francisco-tokens-at-whole-foods.

Poinvil, Frantzy; Non-Final Office Action for U.S. Appl. No. 13/738,949; USPTO Communication; dated Dec. 12, 2013. 8 pp.

Poinvil, Frantzy; Final Office Action for U.S. Appl. No. 13/738,949; USPTO Communication; dated Aug. 18, 2014. 7 pp.

Poinvil, Frantzy; Non-Final Office Action for U.S. Appl. No. 14/625,612; USPTO Communication; dated Jun. 2, 2015. 7 pp.

Poinvil, Frantzy; Final Office Action for U.S. Appl. No. 14/625,612; USPTO Communication; dated Jan. 20, 2016. 10 pp.

Poinvil, Frantzy; Non-Final Office Action for U.S. Appl. No. 15/181,781; USPTO Communication; dated Aug. 24, 2018. 8 pp.

Poinvil, Frantzy; Final Office Action for U.S. Appl. No. 15/181,781; USPTO Communication; dated Feb. 15, 2019. 7 pp.

Poinvil, Frantzy; Non-Final Office Action for U.S. Appl. No. 16/533,445; USPTO Communication; dated Sep. 3, 2020; 19 pp.

"Emirates Bank Adds du to its Online Payments Options", Proquest ID: 194842595, Publication info: Al Bawaba, London (Year: Jun. 28, 2007).

Office Action pertaining to U.S. Appl. No. 17/394,388, dated Nov. 29, 2021; 8 pp.

Office Action pertaining to U.S. Appl. No. 16/532,874, dated Nov. 12, 2021.

Notice of Allowance dated Mar. 4, 2022 in corresponding U.S. Appl. No. 17/394,388.

* cited by examiner

CONSUMER CONTROLLED PORTFOLIO CHARITABLE GIVING SYSTEM AND METHOD

CROSS REFERENCE TO RELATED APPLICATIONS

This application is a continuation-in-part of U.S. patent application Ser. No. 16/533,445, filed Aug. 6, 2019, now U.S. Pat. No. 10,991,015, and titled, "CONSUMER CONTROLLED CHARITABLE GIVING SYSTEM", which is in turn a continuation-in-part of U.S. patent application Ser. No. 16/532,874 filed on Aug. 6, 2019, currently pending, and titled, "PORTFOLIO CHARITABLE GIVING SYSTEM", which in turn claims the benefit of U.S. Provisional Pat. Appl. No. 62/851,552, filed May 22, 2019, with the same title. This application is also a continuation-in-part of U.S. patent application Ser. No. 15/181,781, currently pending, filed Jun. 14, 2016, and titled, "METHOD AND SYSTEM FOR FACILITATING DONATIONS", which is a continuation-in-part of U.S. patent application Ser. No. 14/625,612, now abandoned, filed Feb. 18, 2015 and a continuation-in-part of U.S. patent application Ser. No. 13/738,949, now abandoned, filed Jan. 10, 2013 which claims the benefit of U.S. Provisional application Ser. No. 16/610,912, filed Mar. 14, 2012 and U.S. Provisional Appl. Ser. No. 61/585,075, filed Jan. 10, 2012. All of these applications are herein incorporated by reference in their entirety.

FIELD

The present disclosure relates to systems and methods that enable customers to challenge providers or other entities to make charitable contributions to charities of the customer's choice.

BACKGROUND

Charitable or philanthropic giving has been around for a long time. A main challenge for charitable organizations is to raise funds for their causes. Fundraising is expensive and requires a significant marketing effort. This is particularly problematic for small, relatively local charities—many of which, although they provide funding to areas popular with charitable donors, may be relatively unknown. Additionally, it is difficult for donors or customers to give to two or more charities at one time. Typically, the donors need to find each charity on separate websites and give either a one-time or a recurring donation to each charity. More recently, with the advent of portable electronic devices such as smart phones and tablets, charitable giving has been facilitated using applications that enable donors to give electronically. Systems are also known for small investors that allow them to utilize electronic devices to create and manage, on a cost-effective basis, a complex portfolio of securities, based upon the preferences of the investor. These systems can then initiate trades of the portfolio as a whole or in part in order to facilitate the wants and needs of the small investor.

Today, when a potential charitable donor researches a charity on the internet (or by other means), that donor typically visits many different websites collecting information which might not provide answers to them to make informed decisions on their donation. The landscape for charitable giving is fragmented with many single but different ways for the donor to give.

SUMMARY OF THE INVENTION

There is a need for a donation facilitation system that allows a donor, such as a customer or provider, to challenge another entity, such as a provider, to make a provider contribution to a charity or a portfolio of charities set up by the customer upon, for example, the purchase of a good or service from the provider. There is also a need for a portfolio facilitation system that allows the other entity such as a provider to create its own provider portfolio of charities and make a provider contribution to a customer's portfolio of charities when at least one member of the provider's portfolio of charities matches at least one member of the customer's portfolio of charities. Additionally, there is a need for a customer to challenge providers such as financial institutions, processors or payment networks, card networks, merchants (providers) and individuals to make such a contribution to a provider portfolio of charities.

In one aspect, a donation facilitation system is disclosed that includes a customer having a customer portfolio of charities and a provider having a provider portfolio of charities. In some embodiments, the provider may not have a provider portfolio but may just donate to a charity of his or her choice. The customer can purchase a good or service from the provider. The disclosed donation facilitation system can also include a challenge made by the customer to the provider to make a provider contribution to the customer portfolio of charities when at least one charity in the customer portfolio of charities matches at least one charity in the provider of charities. The disclosed system further includes a challenge contribution made by the provider to the customer portfolio of charities in response to the challenge. In some embodiments, the provider contribution can be a fixed percentage of a price of the good or service or a fixed fee per customer transaction. In some embodiments, the challenge can include a challenge amount and the provider contribution may meet, exceed, or be less than the challenge amount. In another embodiment, the disclosed facilitation system can include a server and can include at least one electronic device in communication with the server. The electronic device can enable the provider to access the customer challenge, the customer portfolio of charities, the provider portfolio of charities. In some embodiments, the challenge contribution can be made to a donor advised fund and the provider can include a financial institution, a processor, a payment network, a card network, merchants, or individuals.

In another aspect, a donation facilitation system is disclosed that includes a customer having a customer portfolio of charities and a provider having a provider portfolio of charities. When the customer purchases a good or service from the provider, a challenge can be made by the customer to the provider for the provider to make a provider contribution to the customer portfolio of charities when at least one charity in the customer portfolio of charities matches at least one charity in the provider portfolio of charities. The provider contribution to the customer portfolio of charities can be made in response to the challenge.

In yet another aspect, a method of facilitating donations is disclosed that includes a provider charging a customer upon purchase of a good or service. The good or service can have a price set by the provider for the good or service. The provider can have a provider portfolio of charities. The method can also include the customer challenging the provider to make a customer contribution to a customer portfolio of charities in addition to the price. The method can also include the provider making the customer contribution to the portfolio of charities when at least one charity in the provider portfolio of charities can match at least one charity in the customer portfolio of charities. The disclosed method also can include the provider making a contribution that can be a fixed percentage of the price, or a fixed fee for each transaction. In some embodiments, the provider contribution can be a combination of a fixed percentage or a fixed fee.

The provided donation facilitation system and method can enable a donor, such as a customer, provider, or both to challenge another entity, such as a provider, to make a provider contribution to a customer portfolio of charities set up by the customer upon, for example, the purchase of a good or service from the provider. The disclosed portfolio donation facilitation system can allow the provider to create his or her own provider portfolio of charities and make a provider contribution to a customer's portfolio of charities when at least one component of the provider's portfolio of charities matches at least one component of the customer's portfolio of charities. In some embodiment, the disclosed method further includes using a server to store the portfolio of customer charities, the portfolio of provider charities, or both.

In this disclosure the term:

"additional contribution" refers to an extra payment made by a customer or consumer to the customer's portfolio when making a purchase from a provider;

"challenge" refers to an amount that the customer requests the provider to contribute to a customer portfolio of charities;

"customer portfolio" refers to a collection of charities set up by a customer or consumer that typically includes from 1 to about 10 or even more charities and is stored in a system server;

"donor advised fund" refers to a dedicated fund, often associated with a financial institution, that collects and stores donations to portfolios (and can earn interest or be a charity itself) and then can distribute or split the donations among the charities in the portfolio according to the rules for distribution of donations to portfolios;

"electronic device" refers to and includes mobile devices, desktop computers, mainframe computers or other electronic computing devices;

"fixed fee" refers to a fee that is a specific amount and particularly refers to a fee that is charged based upon a transaction and not based upon the amount of the transaction;

"fixed percentage" refers to a fee that is a percentage amount of a transaction; "mobile device" refers to smart phones, tablets, laptop computers, or any other portable computing device;

"payment network" refers to a way to move money from one party to another and, unless transactions happen in cash, require a payment system for a smooth transaction.

"price" refers to the amount of money that is expected by a provider from a customer or consumer to obtain a desired good or service. Typically, the price is posted by the provider and is the undiscounted, regular cost of the good or service;

"provider" refers to an entity that offers goods or services for a price or a fee to a customer or consumer. A provider can be a bank or savings institution such as a credit union, a processor/payment network, card networks, merchants, or individuals;

"provider contribution" refers to an extra payment made by the provider to the customer's portfolio of charities;

"provider portfolio" refers to a collection of charities set up by a provider or that typically includes from 1 to about 10 charities (or even about 60,000 charities if, for example, using APPLEPAY) and can be stored in a system server;

"rounded-up" or "round-up" refers to the process of agreeing to pay a price for a good or service and then adding an additional amount (for charitable purposes) to the price to the next dollar or a higher payment amount; and "rules for distribution of donations to portfolios" refers to predetermined splits with predetermined ratios for disseminating funds amassed by portfolios into the charities contained in that portfolio.

The above summary is not intended to describe each disclosed embodiment of every implementation of the present disclosure. The brief description of the drawings and the detailed description which follows more particularly exemplify illustrative embodiments. In the drawings, the layers are not necessarily drawn to scale.

DETAILED DESCRIPTION

Figure 1:
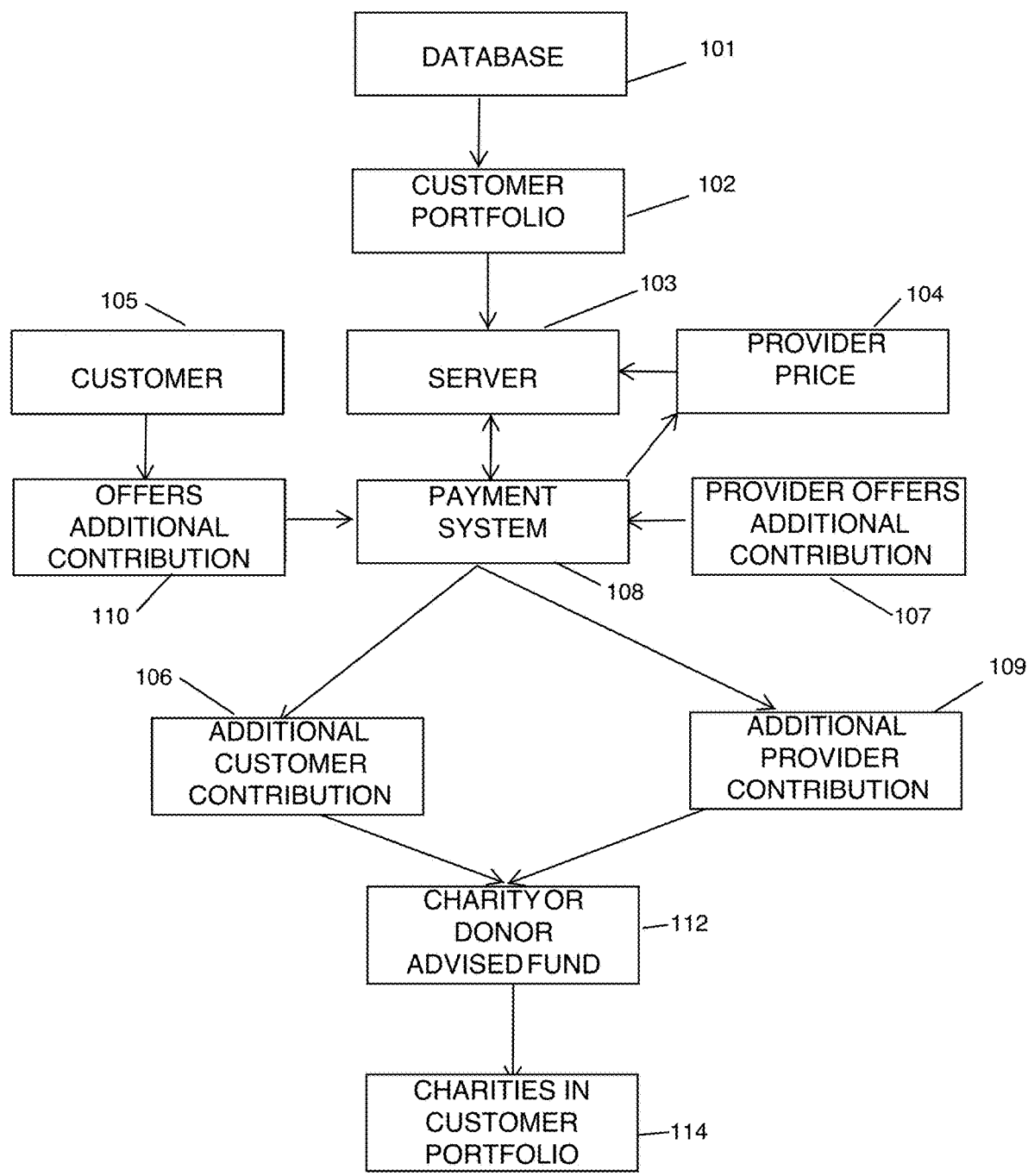
FIG. 1 is flow chart of one embodiment according to the provided disclosure where the customer challenges the provider to make a donation to the customer's portfolio.

Various customer interfaces and embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

Providers often ask customers or consumers if they would like to "round-up" a purchase of a good or service to the nearest dollar for a charity selected by that store. However, this can be an unfulfilling experience for the provider or the customer for a number of reasons. First, the customer may not care about the charity selected for the provider contribution. Second, it is rare that confirmation is received that the donation ever makes it to the charity. Lastly, the verbal back-and-forth with the provider can take time and can be annoying or embarrassing.

The system presented herein turns this system upside down by empowering the customer to challenge the provider to "round-up" or to add an amount over a purchase price of the good or service for the customer's charity of choice, or portfolio of charities. In some embodiments, the provider can offer a discount from the purchase price to the consumer in exchange for having the provider make up at least a portion of the discount to the customer's portfolio of charities. In some other embodiments, the customer can challenge the provider to give a discount on a good or service and then have the provider donate at least a part of the discount to a customer portfolio of charities. The provided system also can also send a notification to both the provider and the customer when the donation is eventually made to the end charity or portfolio of charities. In the provided system, the charitable transaction can occur automatically in a digital conversation that can happen in the background. Essentially, the provider can reward the customer for the customer's business by donating to a charity or portfolio of charities of the customer's choice.

In some embodiments, the system disclosed in the provided disclosure may be incorporated directly into a digital wallet on a mobile device. In other embodiments, the provided disclosure may be a standalone application on a mobile device that interfaces with a digital wallet or links to a real credit card. In yet other embodiments, the provided disclosure may include a "bill-pay" application on a banking website. The provided system can allow the consumer to aggregate donations in a charitable portfolio. The provided system can allow the provider to make a single donation that is distributed to charities at the same time. The system can further permit various types of communication, including social media communication and notification, related to donation and aggregation activity.

Copending U.S. patent application Ser. No. 16/533,445, filed Aug. 6, 2019 (Soderstrom) discloses a "CONSUMER CONTROLLED CHARITABLE GIVING SYSTEM". In this application systems and methods are disclosed that allow a donor, such as a retailer, to make a retailer contribution to a portfolio of charities set up by the donor upon, for example, the purchase of a good or service from the retailer.

Copending U.S. patent application Ser. No. 15/181,781, filed on Jun. 14, 2016 (Soderstrom) discloses a "METHOD AND SYSTEM FOR FACILITATING DONATIONS". In this application methods and systems are disclosed that allows using a computer system that includes at least one server and at least one computing device, that can be a mobile device, to communicably couple the server to the device through a communication network. In some embodiments, the method includes a provider charging a customer a price, the customer offering to make an electronic payment for the price through the computing device, the computing device presenting and customer contribution option to the customer, the customer selecting the customer contribution option, either upon activating the technology, or the technology executing prestored payment option, and making the customer contribution to a donor advised fund. In some embodiments, the customer contribution can be a "rounded-up" amount that the customer adds on to the provider's price with the intention that it will be directed to a charity of the customer's choosing.

Copending U.S. patent application Ser. No. 16/532,874 (also, Soderstrom) filed on the same day herewith, to a "PORTFOLIO CHARITABLE GIVING SYSTEM" that discloses a method and systems of facilitating donations that includes a donor making a charitable donation to a portfolio that includes charities set up by a customer or donor that, in some embodiments, can be a customer or consumer. The method and system include rules set up by the donor for distributing the charitable donation among the charities in the portfolio in a single step at a predetermined time. The rules can be changed by the donor as well as the make-up of the portfolio of charities.

The provided disclosure relates to systems and methods that allow a customer or consumer to challenge a provider to contribute to, to match, or to exceed a customer contribution made to a portfolio of charities upon a purchase of a good or service. The customer can direct a customer contribution to be made to the customer's portfolio of charities and then can "challenge" the provider to make a challenge contribution. In some embodiments, the customer or the provider portfolio of charities may contain only one charity. In some embodiments, the provider may not agree to contribute the whole amount in the consumer's challenge but may be willing to give a portion of the challenged amount to the customer's portfolio. The provider contribution to the customer portfolio of charities can be a fixed percentage of the purchase price of the good or service, a fixed fee based upon the purchase transaction, or, in some embodiments both a fixed percentage and a fixed fee.

As an example, when a customer swipes a MASTER-CARD credit card, typically there is a 2.9% fee for the use of software since financial institutions, processors, payment networks, card networks, and providers are all software providers in financial technology. On a $100 purchase, this 2.9% would amount to $2.90. Every entity in the software chain who makes the transaction happen gets a portion of the $2.90. Typically, the issuing bank (the bank that issued the credit card) gets the largest share. The card network (such as MASTERCARD) gets the smallest share since the bank works hardest to win and keep the customer. The processors also get a cut of the fee. Of the $2.90 fee from this example, some of the providers involved in the transaction(s) might be willing to give a portion of their cut to charity. In fact, one processor already gives 7 cents per card swipe to charity. This processor gives to charity to encourage use of their card through loyalty more than for direct revenue.

Typically, the customer contributions and provider contributions are held in a donor advised fund. This fund, which can additionally be a charitable fund, can be used to escrow the customer contributions and contributions to the customer's portfolio and collect them until, at a predetermined time as, for example, at the end of a week, a month, a quarter, a year, or any other time period, money in the donor advised fund can be distributed to the charities in the customer's portfolio according to rules that have been established by the curator of the customer's portfolio. Alternatively, the funds may be distributed directly to the end charities. The curator can be the customer him or herself, or another entity, which maintains the charitable portfolio by swapping charities in and out of the portfolio. In some embodiments, the curator can be or can act at the direction of a giving circle or group of people (or club) that come together to determine, as a group, sometimes by a vote, which charities to list in the portfolio.

A curator (who may be an individual such as a customer or a provider) can construct a portfolio that includes some of his or her favorite charities. In other embodiments, a portfolio can include a larger number of individual charities. In some embodiments, the charities can have a theme or be related in one way or another (for example, the charities can comprise local school PTA organizations or Boy/Girl scouts). In other embodiments, the portfolio can include charities with a theme such as environmental, medical research, philanthropic goal-oriented themes or others. In some other embodiments the charities are only related to each other in that they are selected by the curator for personal reasons.

In some embodiments, a donation facilitation system is provided that can include a server programmed and configured to host a payment system. The server can be in communication with a mobile device of a customer or consumer and also in communication with an electronic device of a provider. The customer can be provided with an opportunity to make an electronic payment into the payment system of a price charged by a provider for a good or service. The server can be in communication with a mobile device (such as a smart phone of the provider or customer) or another electronic device (of either the provider or the customer). In some embodiments, the server can host a payment system. Exemplary systems that can be useful in this disclosure include CHANGEUP, or KICKSTARTER or other platforms that include electronic payment collection and distribution functions. The provided disclosure will focus on the CHANGEUP platform as an example but should not be construed to be limited only to this platform. There are many others.

In one embodiment presented herein, both providers and customers can join the CHANGEUP platform and can create their own portfolios. The portfolio may hold anywhere from 1 to one million charities. In some embodiments, a customer may have a portfolio that has about 10 charities and a provider may have a portfolio that has, for example, 61,212 charities ("all public high schools in America") plus all environmental organizations, and also the American Red Cross.

Then, by way of example, the CHANGEUP platform can allow these two portfolios to communicate with each other to determine if any of the charitable members of each of the two portfolios match. After a consumer has linked his payment method to the platform, the consumer can go out and use a payment method such as a credit or debit card. When the payment method is used at a provider that has also joined the platform, the provided system can determine if the customer and the provider share an affinity for at least one charity in their respective portfolios (or if there is a match between one or more charities in the customer's portfolio and the provider's portfolio). If there is a match of at least one or more charities in each portfolio then the provider will be notified via a report that funds will be withdrawn from the provider's linked payment method account and sent to that particular charity on behalf of the customer. In some embodiments, rules can be set up by either the customer or the provider that more than one charity needs to match before the funds are transferred.

In the provided but not limiting example, CHANGEUP can compare the portfolio of the customer and the portfolio of the provider to find one or more matches. If there are one or more matches then CHANGEUP may add customer contributions or provider contributions based upon rules or rankings set up and applied by the consumer and the provider, individually, on each of their respective portfolios. If a match is found, then funds can be transferred from the provider into a donor advised fund that will hold the funds until they are distributed to the respective charities in common with both portfolios according to the distribution frequency and rules set up for the platform.

Providers may show a physical symbol or sticker that announces the ability for a customer to utilize the present invention at that provider's place of business and therefore partner with that provider (in a way) support their customer's portfolios of charitable contributions. Additionally, providers can support their own portfolios of charitable organizations for reasons such as attracting customer to their products, pursing their own altruistic goals, or to decrease their tax liability.

It is also contemplated that providers can include banks, savings institutions, credit unions or other financial institutions. They can, as a provider, offer customer contributions to charities of the customer's choice in order to attract additional business.

In some embodiments, processors can include payment networks. Examples of common payment networks today include VISA, MASTERCARD, and MAESTRO, to name a few. Other non-limiting examples of payment networks include financial services providers such as, for example, FIRST DATA, FiSERVE, STRIPE, ADYEN and others.

In some embodiments, a provider may have a non-profit organization or fundraising campaign that it supports (for example, the Red Cross), and a customer can elect to donate rounded up amount to the provider's campaign, and/or split the rounded-up amount between the provider's campaign and the customer's campaign.

In another embodiment, the customer can designate or be notified by specific providers in advance and receive location-specific messages (via GPS, Wi-Fi, or other location technologies), offers or benefits when in proximity to a provider participating in the program. The customer can also designate certain non-profits or charitable institutions whose location may trigger similar notices or messages. Thus, the customer on foot could be alerted to the existence of a provider or non-profit and engage in a purchase, yielding additional savings, or make a donation.

A customer may assign an identifier such as a name, number, or moniker to the customer's personal fundraising cause. This identifier can be associated with that customer's efforts to raise money. The customer can utilize that name or number to recruit friends to a particular fundraising campaign. This can also cause location-specific notices to be sent to friends when they are in physical proximity to a participating provider or designated non-profit.

In some embodiments, the rounded-up amount may be incorporated into an online retail store and catalogue where customers can round up their purchases, but also share with others their own "store" on social networking sites that promote products they like.

In some embodiments, the provided disclosure can track the spending habits of an individual instead of, or in addition to, operating as a payment system. The system can read the individual's payment or donation history and can offer analyses of the data, such as amount spent over the previous week, month, year, etc. In some embodiments, the disclosed system and method can be integrated with social media and social networking sites. The system can be a social media platform that uses an algorithm to measure, accumulate, and direct customer's transactional "round-up" on purchases into fundraising campaigns.

The integration of the disclosed system and method with social networking sites can allow customers to lead, promote and contribute to fundraising campaigns using a previously designated character or combination of characters that is/are inter-operable with a mobile application or any other application that relates to the present invention, like a digital wallet application, and allows customers to automatically apply their rounded up amounts to a non-profit organization or fundraising campaign of their choosing. The "rounded-up" amounts may be applied on a one-time basis in some examples or may be applied for a specified period of time (i.e., one month).

In some embodiments, the disclosed application may send a notification to the customer or to the recipient of funds (for example, a non-profit organization or fundraising campaign) when funds are donated using the system. These notifications may be sent to a customer or fund recipient through a social network, such as TWITTER or FACEBOOK, or may be sent by other delivery routes such as email or text message. Updates to a customer's social networking profile related to the present invention can be done in any way that is allowed by the social networking site, for example by use of a personal computer, smart phone or other mobile device.

The present disclosure can also be used in social media to facilitate gamification of fundraising campaigns. More specifically, the invention can not only provide technology that allows customers to "round-up" their purchases, but also can bundle those "round-up" purchases into a larger marketplace that can assigns values and can directs those values to a specific campaign.

For example, a customer can choose a specific organization or a general category, such as climate change, for a fundraising effort to which they want to donate. If the customer chooses to donate to a general category, the specific organization that will receive the donation can be dependent upon the organization's social media presence, with the organization that receives the most social media attention being the organization that also receives the most, or all, of the general category donations.

In one embodiment, customers can elect, at the time of the donation, whether or not their donations are subject to the various competitions or challenges. Alternatively, customers can opt out of the competition and simply assign their donations to a single cause of their choice. In another embodiment of the competition or challenge, customers may be able to create a one on one competition, wherein each customer supports a specific organization and the customers attempt to increase their representative organization's scores by having other customers donate to one of the two organizations in the competition. One example of where this type of competition could be especially effective is when public figures, such as celebrities, engage in a public competition to bring awareness to causes and to foster friendly competition among fans. In one embodiment, at the end of the competition, the organization that has the highest score can win the other organization's accumulated donations.

In a further embodiment, concerts, sporting events, and retail outlets can compete against each other to send all of their "round-up" transactions to pre-chosen causes. For example, all National Football League (NFL) stadiums in a given day can compete against each other to see which stadium's fan base can bring the most attention to a local cause on social media. The stadium that ends the competition with the greatest number of points (for example, by using a formula similar to the one described above) can win all of the "round-up" donations for that week.

In one embodiment, leaderboards can be created for individual customers. For example, each customer can be rated according to the total number or total value of "round-up" donations the customer generates and the amount of social media interactions the customer receives. The individual leaderboard can be determined using a formula similar to the variations described above. Customers can then compete against each other to generate the greatest number or value of "round-up" donations for a particular cause, such as, but not limited to, an alma mater, non-governmental organization, political campaign, hospital campaign, etc. In one embodiment, as motivation, the top ten leaders on each leaderboard for each category of cause can get special treatment from that cause.

In some embodiments, customers can track their donations and voluntarily donate to their campaign even if they are not making a purchase. This may enable a customer to be placed on a leaderboard or be placed further up on the leaderboard for a specific month. By enabling competitive donations, the system may encourage individuals to share leaderboard news on social media and/or challenge others. In some embodiments, if a customer is a leader over a predetermined amount of time (i.e., twelve months), the customer can be rewarded.

In one embodiment, customers who have amassed a pre-defined threshold of "round-up" donations or who have become top customers through the leaderboard can operate as "bundlers". Bundlers can be trusted leaders in the donation community who are eligible to receive the "round-up" donations from other customers who trust the bundler to disperse the funds wisely. Further, a bundler can receive a small commission for each customer the bundler invites to use the system, thus building the bundler's value with every customer recruited.

In some embodiments, bundlers can operate as a form of electoral college, wherein all of the bundler's constituents move "round-up" donations through them. This can infuse the provided system with politics, competition, and lobbying that allows for dynamic interactions. If a customer does not want to be involved in this type of system, however, the customer can opt out of the leaderboard feature and simply engage as a standalone experience where the customer has a direct relationship with the cause the customer is benefitting. This would be appropriate if a customer was donating to, for example, a grandchild's college fund.

Millions of people may round up amounts on purchases daily, therefore contributing large amounts of monies into a central holding fund, which may operate as a bank of sorts, or a mutual fund that grows, earns interest, and delivers dividends. Therefore, a customer can "donate" to his or her own account in order to save or invest money.

In some other embodiments, another party such as a foundation may also participate in the customer challenging a provider and may add an additional contribution to the customer's portfolio, perhaps as an incentive to shop at the provider.

In another embodiment, customers may compete with each other in a contest for the greatest number of contributions per time period, the largest sum total of contributions per time period, or other statistics related to use of a customer challenge. Additionally, a "lottery" type of system can be used such as picking a number of contributions that would be the winner in any given time period. These competitions or lotteries can have provider contributions to the charity or to the customer as a prize and can be used as an incentive to promote use of the customer challenge system.

As noted, the provided system and methods can work in combination with existing digital wallet applications or be its own digital wallet application with the "round-up" functionality and social network engagement embedded therein.

Turning now to the Figures which exemplify parts of the provided system and methods, FIG. 1 is flow chart of one embodiment according to the provided disclosure where the customer challenges the provider to make a donation to the customer's portfolio. Database 101 is used as the source of charities are selected by the customer for inclusion in customer's portfolio 102. The list of charities can be by a third party, by a process that eliminates organizations that engage in criminal, unethical, or otherwise undesirable practices. The charities, known as the net number of charities, can then be used by the user, customer, or provider to create a personalized portfolio. These can be for national, regional, or local charities such as, for example, listing well-known charity organizations such as the National Audubon Society or the American Cancer Society, lesser known and more localized charities such as the Los Angeles branch of the Humane Society, or very localized charities such as the PTA of a local school. These charities can be selected to create a personalized portfolio for each charitable donator. Other examples of custom portfolios are discussed below.

Customer portfolio 102 is stored in server 103 and is in communication with a payment system stored therein. Provider 104 offers a good or service for a price. Customer 105 wishes to purchase the good or price from the provider through payment system 108. In one embodiment, customer 105 can offer to pay the price along with a customer contribution (which may be a "round-up" to the nearest dollar) as shown in 106. Payment system 108 which is in communication with server 103 takes the payment 106 from the customer and then pays the price to provider 104. Provider 104 has also offered to customer 105 to pay a provider contribution 109 through payment system 108. An additional provider contribution 107 can be offered by the provider. The customer contribution 110 offered by customer 105 and the provider contribution offered by provider 104 are then transferred from payment system 108 to a charity or a donor advised fund 112 and then eventually paid to the charities in customer portfolio 102 according to rules set up for the distribution of funds to the individual charities in the customer's portfolio. In some embodiments, the additional contribution 106 or 109 can be distributed directly to charities in customer portfolio 114. In FIG. 1, customer accesses server 103 and payment system 104 through a mobile device. Provider uses an electronic device to also access server 103.

Figure 2:
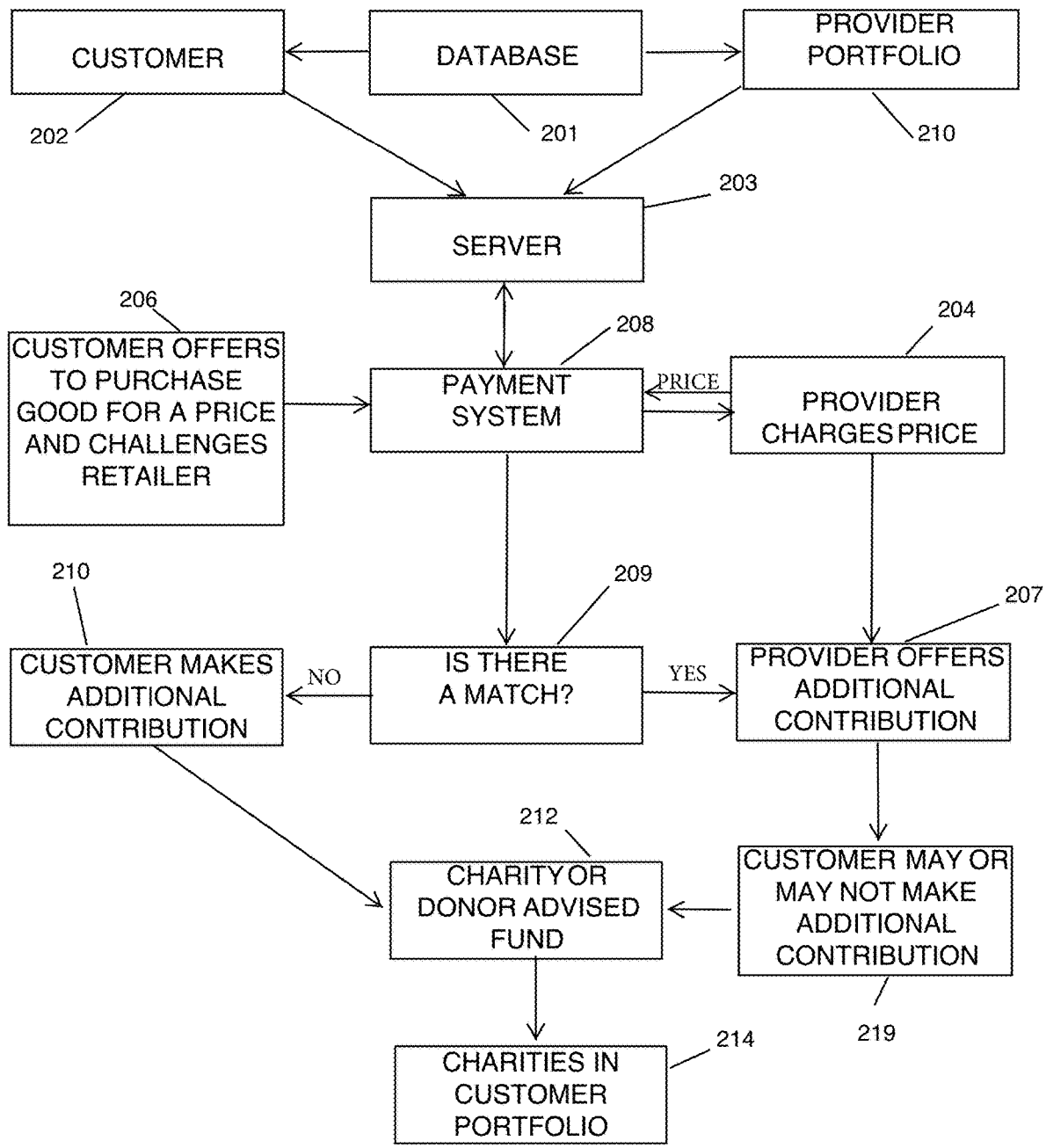
FIG. 2 is a flow chart of another embodiment according to the provided disclosure where the customer challenges the provider to make a donation to the customer's portfolio if there is a match between at least one charity in the customer's portfolio and the provider's portfolio.

FIG. 2 is a flow chart of another embodiment according to the provided disclosure where the customer challenges the provider to make a donation to the customer's portfolio if there is a match between at least one charity in the customer's portfolio and the provider's portfolio. In FIG. 2, a consumer portfolio 202 and a provider portfolio 210 are assembled from database 201 and both are stored in server 203. In the system illustrated in FIG. 2, provider 204 offers a price for a good or service through payment system 208. Customer 206 offers to buy the good or service offered by provider 204 for a price charged by provider 204 and challenges provider 204 to offer to make a provider additional contribution 207 to charity or donor advised fund 212 if there is a match 209 between at least one member in provider portfolio 210 and customer portfolio 202. In response to a provider additional contribution 207 the customer may or may not make an additional contribution 219. If there is no match, customer 206 can still make a payment to provider 204 for the good or service through payment system 208 and can still have his own customer contribution to his donor advised fund 212. However, the customer may decide not to purchase anything unless there is a match of at least one member of customer's portfolio and provider's portfolio. If there is a match 209 then customer may or may not make an additional contribution 210. Provider contribution 207 id made to customer's donor advised fund 212 that is in addition the customer contribution to that fund. In some embodiments, the provider can offer to give a contribution to the customer's portfolio if, for example, the customer agrees to buy from the provider or for any other promotional reason.

Figure 3:
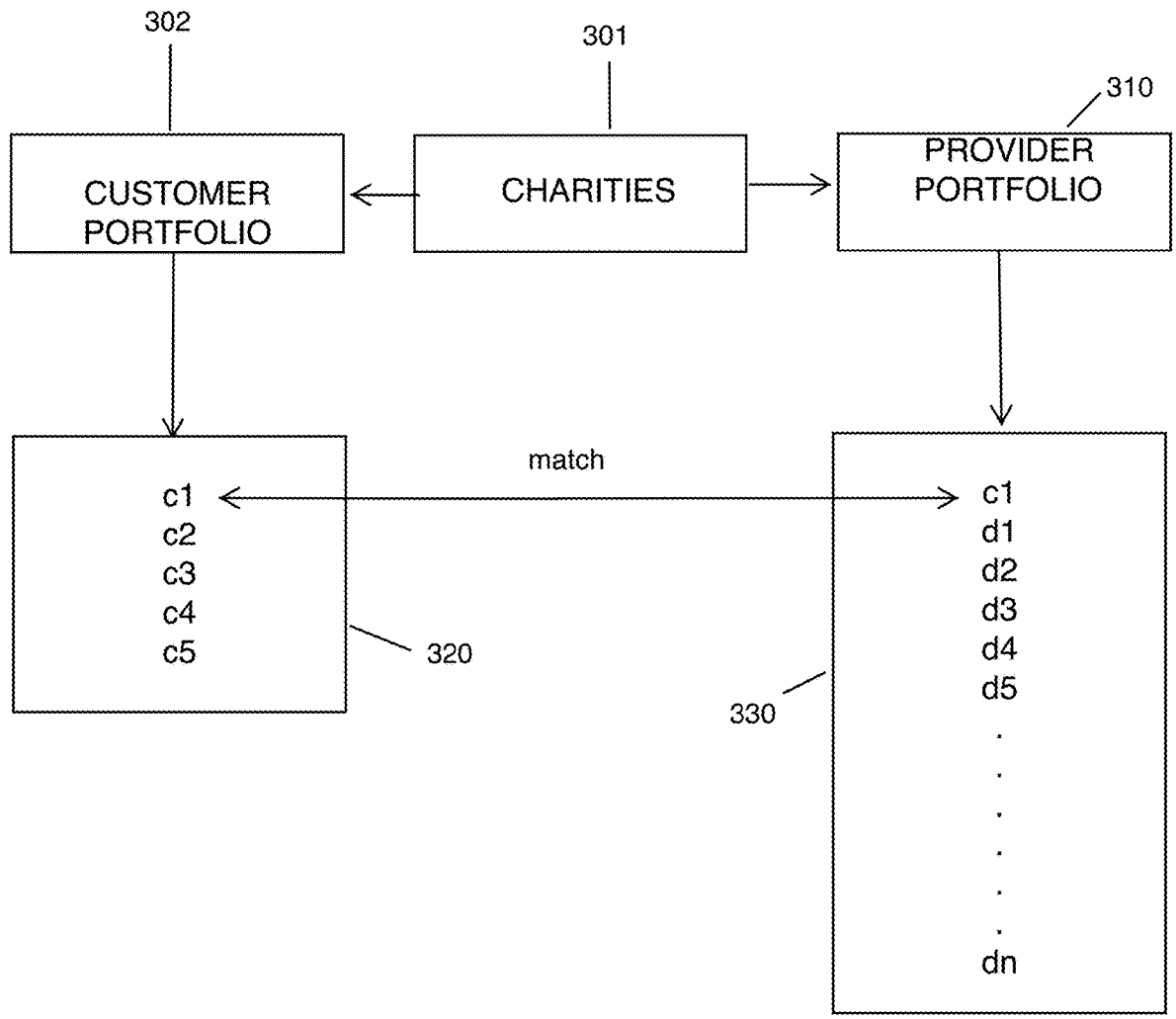
FIG. 3 is flow chart showing matching between at least one member of a customer's portfolio and at least one member of a provider's portfolio.

FIG. 3 is flow chart showing matching between at least one member of a customer's portfolio and at least one member of a provider's portfolio. In FIG. 3, customer portfolio 302 has charities (c1, c2, c3, c4, and c5) selected from charities 301 as shown in 320. Similarly, provider portfolio 310 has many more charities selected from charities 301. In the exemplified case provider portfolio includes (c1, d1, . . . , dn). Since both customer portfolio 320 and provider portfolio 330 have one of the same charities, namely c1, there is a match in this embodiment.

Figure 4:
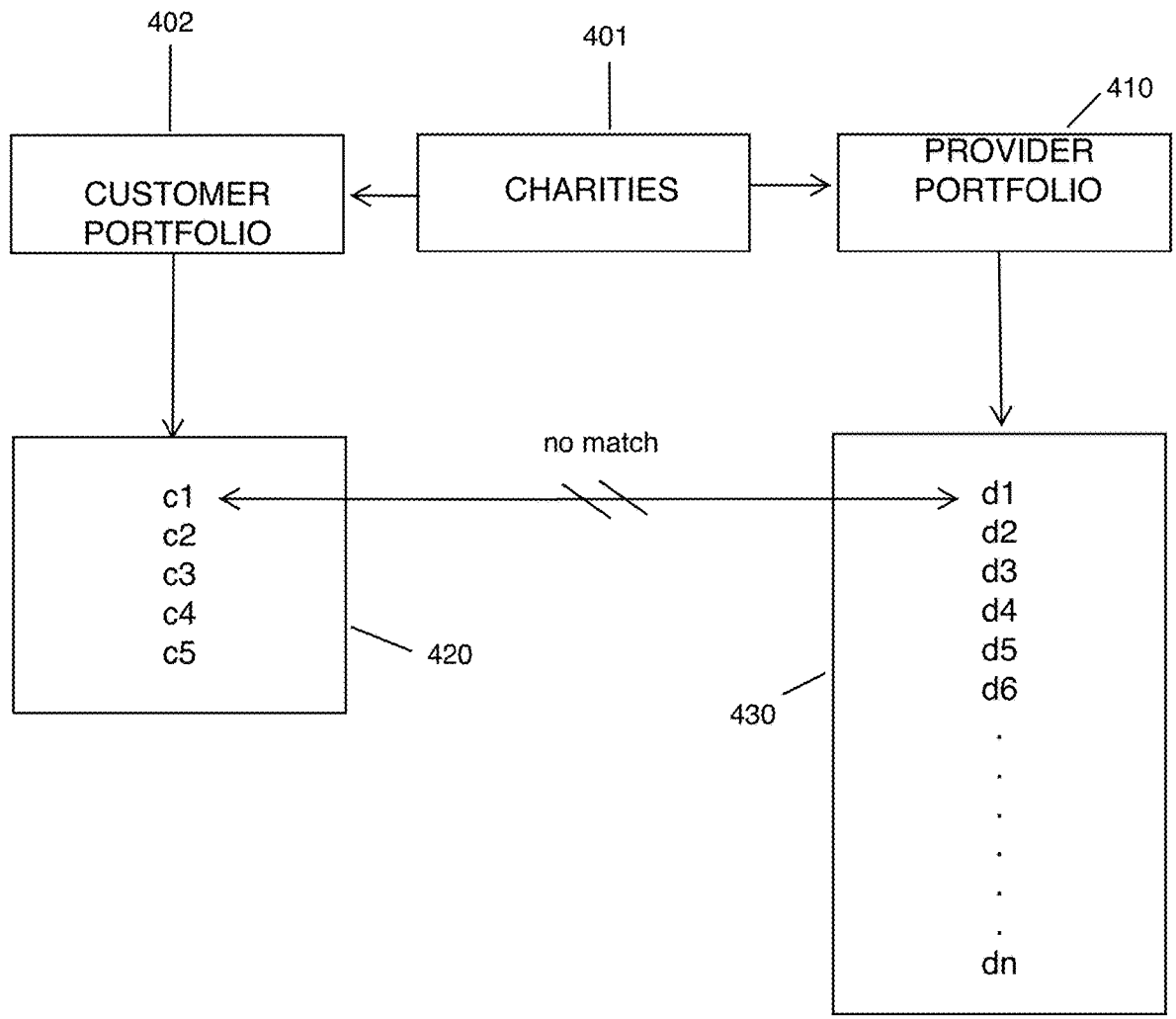
FIG. 4 is flow chart showing no matching between at least one member of a customer's portfolio and at least one member of a provider's portfolio.

FIG. 4 is flow chart showing no matching between at least one member of a customer's portfolio and at least one member of a provider's portfolio. In FIG. 4, customer portfolio 402 has charities (c1, c2, c3, c4, and c5) selected from charities 401 as shown in 420. Similarly, provider portfolio 410 has many more charities selected from charities 401. In the exemplified case provider portfolio includes (d1, . . . , dn). Since neither customer portfolio 420 nor provider portfolio 430 have any of the came charities, there is no match in this embodiment.

Figure 5:
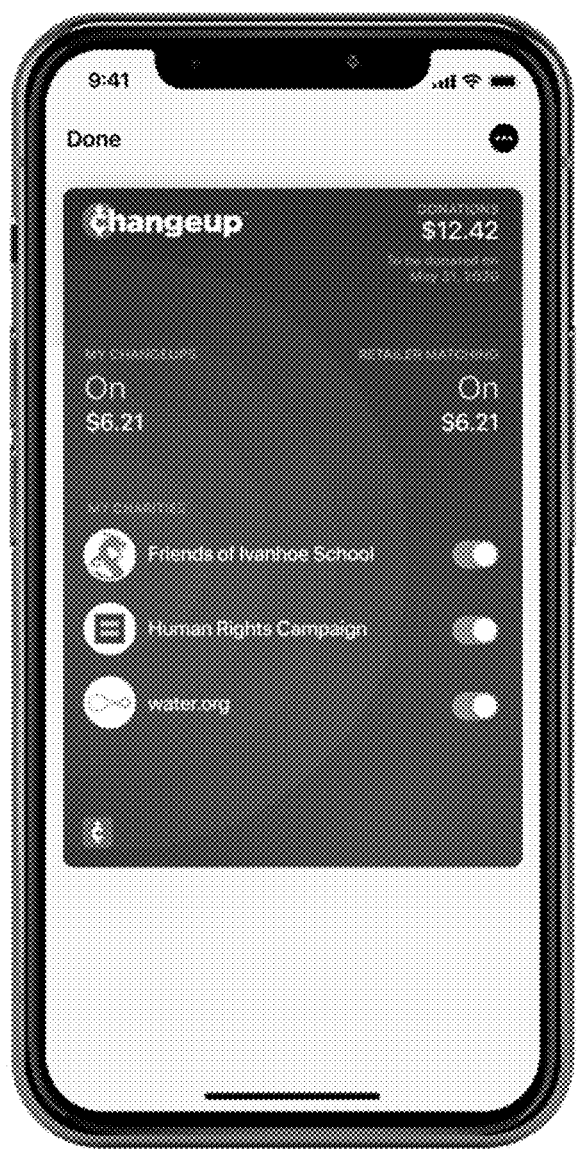
FIG. 5 is a screen shot of an exemplary embodiment of the present disclosure of a customer's portfolio that includes three charitable organizations.

FIG. 5 is an iPhone screen shot of an exemplary embodiment of the present disclosure of a customer's portfolio that includes three charitable organizations. The screen shot in FIG. 5 uses the CHANGEUP app on an iPhone and shows one customer's portfolio that includes three charities—Friends of Ivanhoe School, Human Rights Campaign, and water.org. In this embodiment, to date the customer has made a $6.21 customer contribution to his portfolio and providers have made a similar $6.21 provider contribution to the customer's portfolio as shown in the total of $12.42 donated to the portfolio by both donations.

Figure 6:
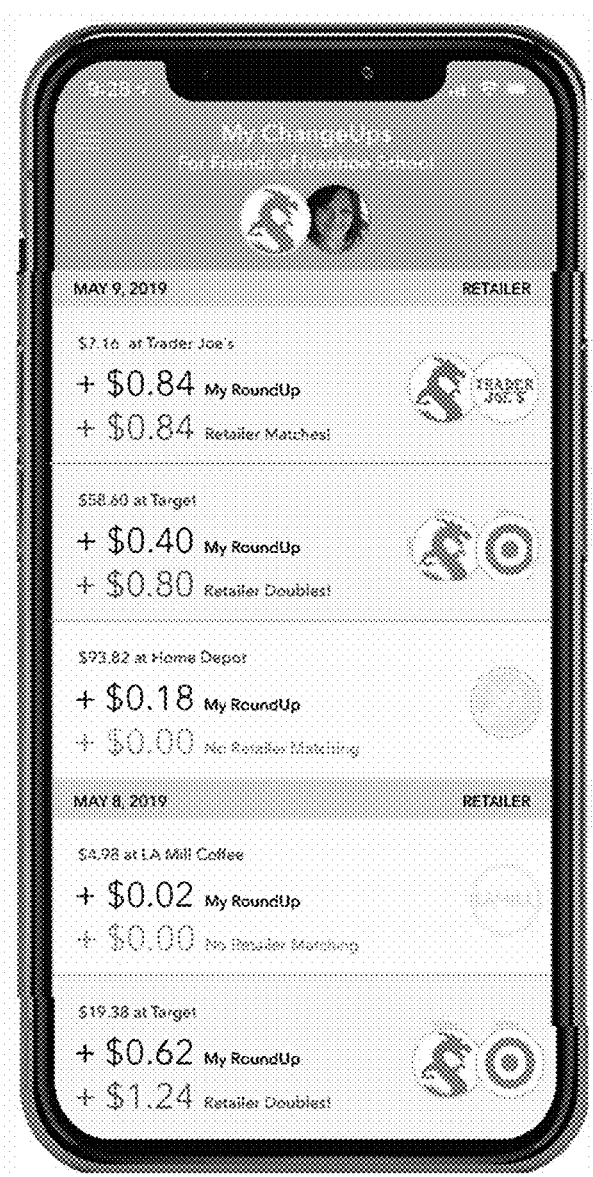
FIG. 6 is a screen shot of an exemplary embodiment of the present disclosure of a portfolio match between a customer's portfolio and a provider's portfolio.

FIG. 6 is an iPhone screen shot of an exemplary embodiment of the present disclosure of a portfolio match between a customer's portfolio and a provider's portfolio. In FIG. 6, a customer has a portfolio that contains only one charity. That portfolio (named Friends of Ivanhoe School) has received donations on two different dates, May 8, 2019 and May 9, 2019. On May 8, the customer made two purchases—one for $4.98 to LA Mill Coffee. There was not match between provider's portfolio and the customer's portfolio, so no provider contribution was made. However, the customer rounded-up the price of a cup of coffee that caused $0.02 to be put in her donor advised fund. In some embodiments, the rounded-up amount can be sent directly to the customer's charity. In another purchase on the same day, $19.38 was spent at Target and this time, the customer added $0.62 by rounding-up her purchase. Target had a special double match for that transaction and also matched its portfolio with customer's portfolio (both had Friends of Ivanhoe School as respective portfolio members). In this case $0.62 (from customer contribution) and $1.24 (from provider's double match), or a total of $1.86 was sent to customer's donor advised fund for contribution to customer's charity. In some embodiments, portfolio matching can be offered as a percentage of the purchase and be offered to the customer to be added to his portfolio of charities as, for example, 5% cash back and presented as a "round-up."

On May 9, three transactions are shown in the screen shot of FIG. 6. In the first two (Trader Joes and Target) portfolio matches were found between customer's portfolio and provider's portfolio so matches were made to the customer contribution "round-up" and provider's provider contribution. In fact, Target still matched customer contribution with a double provider contribution. In the last transaction of that day only the customer's "round-up" payment was made since Home Depot did not have a portfolio match with the customer.

Figure 7:
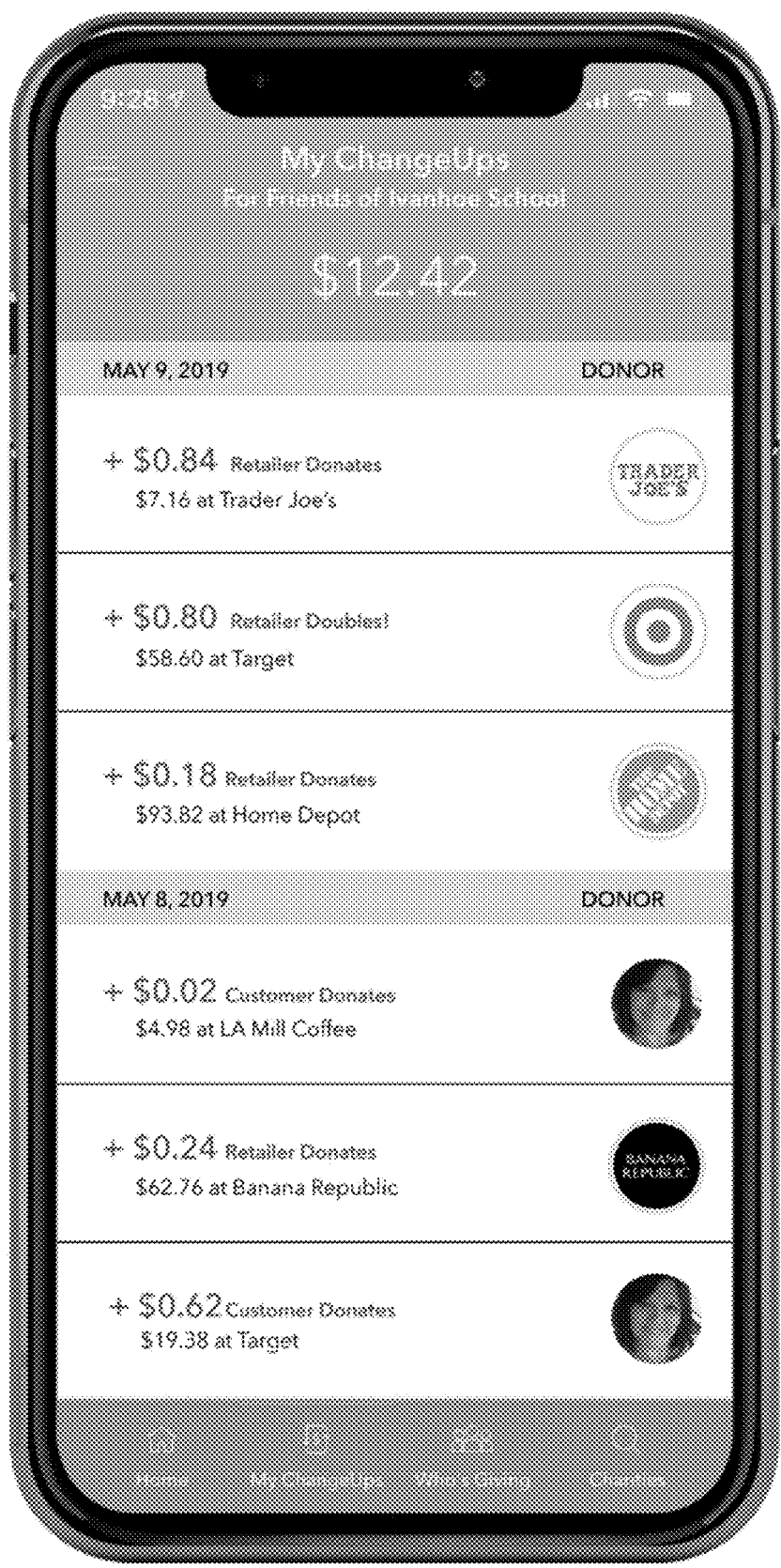
FIG. 7 is a screen shot of an exemplary embodiment of the present disclosure showing three customer match transactions on May 9, 2019 and one customer match and two customer nonmatches on May 8, 2019.

FIG. 7 is an iPhone screen shot of an exemplary embodiment of the present disclosure showing three customer match transactions on May 9, 2019 and one customer match and two customer nonmatches on May 8, 2019. FIG. 7 shows most of the same transactions made on May 8 and May 9. In this exemplary screen shot three "round-up" transactions were made by the customer to LA Mill Coffee, Banana Republic, and Target. This screen shot shows the amount contributed by the customer (and, in the case of Banana Republic a provider contribution) to customer's donor advised fund. The total amount spent at these three businesses is also tracked in this screen shot. Similarly, on May 9 three transactions were made a Trader Joes, Target, and Home Depot. The providers all matched the customer's contributions with provider contributions (and, in the case of Target they doubled the match). Again, the total spent at these three businesses is tracked.

Figure 8:
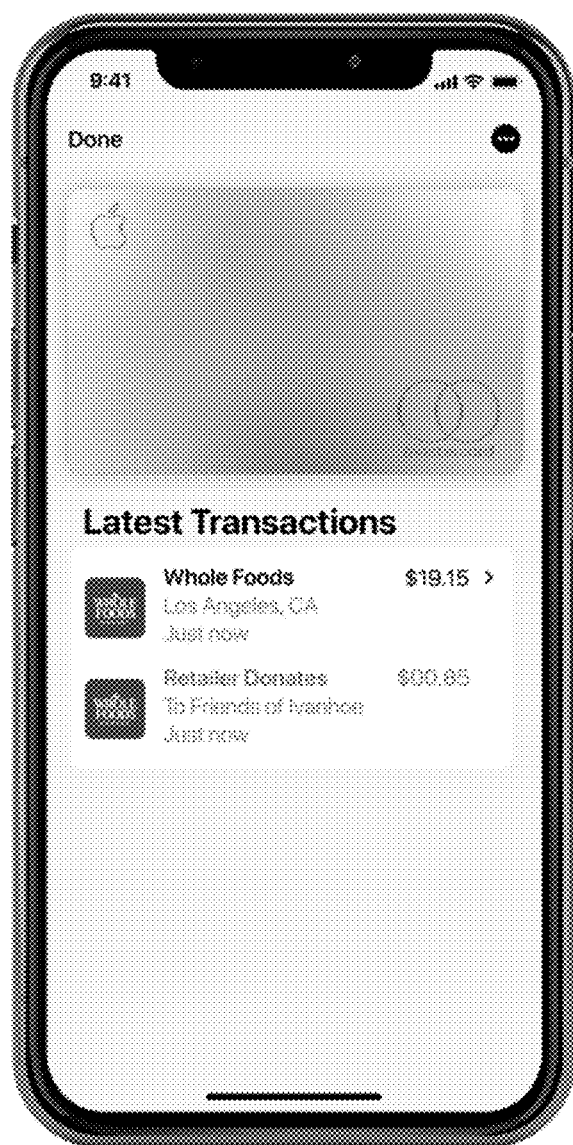
FIG. 8 is a screen shot of an exemplary embodiment of the present disclosure showing a transaction that includes a provider donation to one or more charities in the customer's portfolio.

FIG. 8 is an iPhone screen shot of an exemplary embodiment of the present disclosure showing and transaction that includes a provider donation to the customer's portfolio. This screen show shows a transaction of $19.15 made to Whole Foods and a donation of $0.85 to customer's portfolio (that contains one charity, Friends of Ivanhoe). In this example, only the provider has made a contribution to the customer's charity or portfolio of charities. The customer has not made his or her own rounded-up donation.

Figure 9:
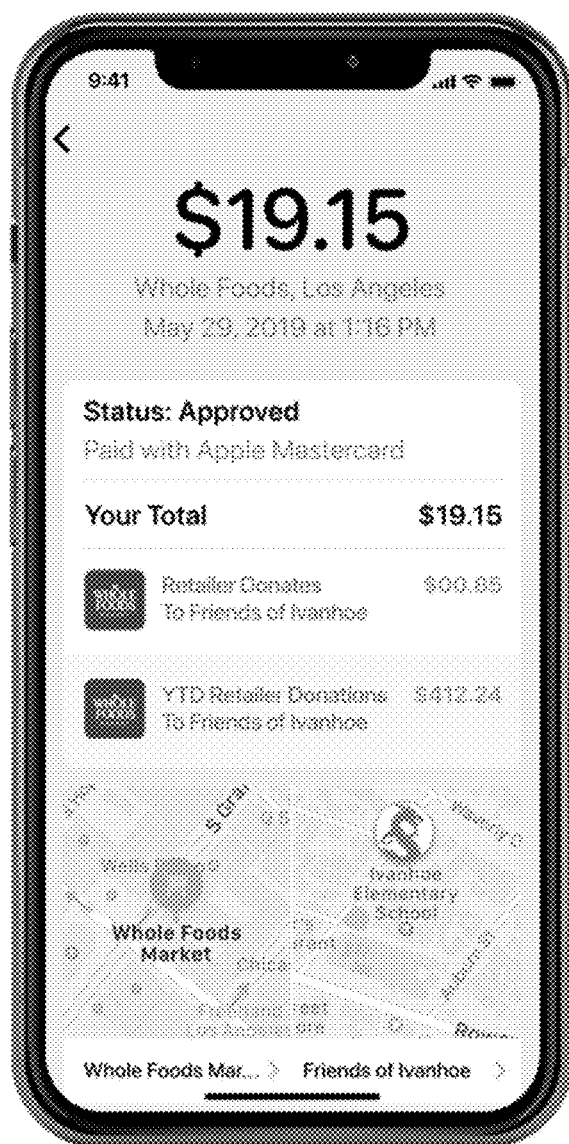
FIG. 9 is a screen shot of an exemplary embodiment of the present disclosure that shows a year-to-date report of the contributions of a provider to one or more charities in a customer's portfolio.

FIG. 9 is a screen shot of an exemplary embodiment of the present disclosure that shows a year-to-date report of the contributions of a provider to a customer's portfolio. This screen shot (paid with credit card) shows that a year-to-date (YTD) total of $412.24 has been made on behalf of multiple consumers in a circle giving group.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A donation facilitation system comprising:
a data storage device that stores content;
an application, associated with a customer account, executed on a computing device for buying goods or services; and
a network server, which is in communication with the application, containing at least one processor in communication with a network of at least one provider associated with a portfolio of at least one charity, and is in communication with the data storage device, wherein the at least one processor performs operations comprising:
receiving, from the application associated with the customer account, information purchases by the customer of a good or service, a challenge for the provider to make a contribution to the at least one charity based on user selection of the at least one charity, information about the amount of the provider contribution;
determining the at least one charity to receive the provider contribution; and
storing contribution information of the provider contribution to the at least one charity in association with the customer account.

2. A donation facilitation system according to claim 1, wherein the provider contribution is a fixed percentage of the purchase or a fixed fee based upon the customer purchase; further wherein the network server sends the provider contribution associated with the at least one charity for updating the graphical display output with the information and provider pays the contribution to the recipient charity of the at least one charity.

3. A donation facilitation system comprising:
a data storage device that stores content;
an application, associated with a customer account, executed on a computing device for buying goods or services; and
a network server, which is in communication with the application, containing at least one processor in communication with a network of at least one provider associated with a portfolio of at least one charity, and is in communication with the data storage device, wherein the at least one processor performs operations comprising:
the customer account accessible via application; wherein the customer account is associated with a customer portfolio of at least one charity and a provider having a provider charity or a provider portfolio of multiple charities,
wherein the customer purchases a good or service from the provider for a price; and
a challenge, sent by the customer to the provider using the application on the computing device, for the provider to make a provider contribution to the customer portfolio of at least one charity when the at least one charity in the customer portfolio matches at least one charity in the provider portfolio of multiple charities, wherein the contribution is stored in the data storage device in association with the customer account and the customer portfolio is updated with the stored contribution.

4. A donation facilitation system according to claim 3, further comprising a challenge contribution made by the provider to the customer portfolio of multiple charities in response to the challenge based on the price of the purchased goods or services.

5. A donation facilitation system according to claim 4, wherein the provider contribution comprises a fixed challenge amount based on a value selected by at least one of the customer and the provider.

6. A donation facilitation system according to claim 5, wherein the fixed challenge amount is either a fixed percentage of the price or a fixed fee per transaction.

7. A donation facilitation system according to claim 3, wherein the challenge comprises a challenge amount.

8. A donation facilitation system according to claim 7, wherein the provider contribution meets or exceeds the challenge amount.

9. A donation facilitation system according to claim 7, wherein the provider contribution is less than the challenge amount.

10. A donation facilitation system according to claim 3, further comprising a server comprising the portfolio of customer charities, the portfolio of provider charities, or both.

11. A donation facilitation system according to claim 10, further comprising at least one computing device in communication with the server.

12. A donation facilitation system according to claim 11, wherein the at least one electronic device comprises a mobile device.

13. A donation facilitation system according to claim 12, wherein the at least one electronic device allows the provider to access the customer challenge, customer portfolio of charities, or the provider portfolio of charities.

14. A donation facilitation system according to claim 4, wherein the challenge contribution is made to a donor advised fund.

15. A donation facilitation system according to claim 3, wherein the provider comprises a financial institution, a processor, a payment network, a card network, merchants, or individuals.

16. A method of facilitating donations comprising:
a network server configured with at least one processor, wherein the at least one processor is configured to carry out steps, including:
receiving, from a provider, a price associated with a charge for a good or service, wherein the provider has a provider portfolio of multiple charities;
sending, to a computing device executing at least one application associated with purchasing goods or services, the price for the good or service and provider portfolio information;
receiving, from the customer and by the network server, a challenge challenging the provider to make a contribution to a customer portfolio of at least one charity based at least in part on the price or in addition to the price;
making, from the provider, the contribution to the portfolio when at least one charity in the provider portfolio of multiple charities matches at least one charity in the customer portfolio; and
sending, to the computing device, the contribution information associated with portfolio that received the contribution.

17. A method of facilitating donations according to claim 16, wherein the provider contribution comprises a fixed percentage of the price, or a fixed fee for each transaction.

18. A method of facilitating donations according to claim 16 further comprising using a server to store the portfolio of customer charities, the portfolio of provider charities, or both.

19. A method of facilitating donations according to claim 18 further comprising at least one computing device in communication with the server.

20. A donation facilitation system comprising:
a computing device executing at least one application for purchasing goods or services;
a network in communication with the computing device having a customer portfolio associated with at least one charity, wherein the customer portfolio is stored in a network server in association with the customer, and a merchant having a merchant portfolio of at least one charity; execution of the at least one application cause the processors of the network server to:
send information about the at least one charity of the merchant portfolio to the at least one application;
receive a challenge, from the application associated with purchasing goods or services or both on the computing device and by the network server, for the merchant using the computing device to make a merchant contribution to the at least one charity, based on a selection by the customer, when the at least one charity selected is in the merchant portfolio of charities; and
send the merchant contribution, from the merchant through the network server to the selected charity of the customer based on the customer selection in response to the challenge; and the merchant contribution is stored on a storage device in communication with the network an in by sending the merchant.

21. A donation facilitation system comprising:
a computing device executing at least one application for purchasing goods or services;
a network in communication with the computing device and communication with the computing device association with a customer having a charity of the customer's choosing and a merchant having a merchant portfolio of charities,
a purchase of a good or service from the merchant;
responsive to the customer purchases, a challenge made by the customer via the network to the merchant to make a merchant contribution to the charity of the customer's choosing when the charity by execution of the application on the computing device, by matches at least one charity in the merchant portfolio of charities, wherein the chosen charity is stored on a network server in association with the customer; and
a merchant contribution to the charity of the customer in response to the challenge by through the network during execution of the application on the computing device, and
the contribution is stored on the network server in association with the merchant.

22. A donation facilitation system comprising:
a computing device executing at least one application for purchasing goods or services;
a network in communication with the computing device and in communication with a merchant having a portfolio of charities and a customer having a chosen charity, and through the network communication, the merchant makes a donation to the customer's chosen charity when the customer's chosen charity matches at least one of the charities in the merchant's portfolio of charities wherein the donation made is stored in association with the charity and used to determine a preference of the customer; and
the network communication stores in association with the customer and used for future challenges to determine a charity suggestion.

23. A donation facilitation system according to claim 22, wherein the donation facilitation system interfaces with a digital wallet, an electronic money transfer service, or links to a credit card.

* * * * *